(12) United States Patent
Xu et al.

(10) Patent No.: US 9,549,377 B1
(45) Date of Patent: Jan. 17, 2017

(54) POWER CONTROL METHOD AND DEVICE

(71) Applicant: Huawei Technologies Co., Ltd., Shenzhen, Guangdong (CN)

(72) Inventors: Wenying Xu, Shanghai (CN); Fan Wang, Kista (SE); Xueli Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/266,792

(22) Filed: Sep. 15, 2016

Related U.S. Application Data

(63) Continuation of application No. PCT/CN2014/073632, filed on Mar. 18, 2014.

(51) Int. Cl.
| | |
|---|---|
| *H04B 7/00* | (2006.01) |
| *H04W 52/14* | (2009.01) |
| *H04W 52/44* | (2009.01) |
| *H04W 52/24* | (2009.01) |
| *H04W 72/12* | (2009.01) |
| *H04W 72/04* | (2009.01) |
| *H04W 84/04* | (2009.01) |

(52) U.S. Cl.
CPC ......... *H04W 52/146* (2013.01); *H04W 52/241* (2013.01); *H04W 52/44* (2013.01); *H04W 72/042* (2013.01); *H04W 72/1284* (2013.01); *H04W 84/042* (2013.01)

(58) Field of Classification Search
CPC .. H04W 52/146; H04W 52/44; H04W 52/241; H04W 72/1284; H04W 72/042; H04W 84/042

USPC .......... 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS

| | | | | |
|---|---|---|---|---|
| 6,564,067 | B1 * | 5/2003 | Agin | ..................... H04W 52/24 370/318 |
| 6,603,980 | B1 * | 8/2003 | Kitagawa | .............. H04W 52/04 370/310 |
| 7,366,137 | B2 * | 4/2008 | Abrishamkar | ....... H04B 1/1027 370/332 |
| 7,626,970 | B2 * | 12/2009 | Agin | ..................... H04W 52/12 370/335 |
| 7,995,551 | B2 * | 8/2011 | Yano | ....................... G08C 15/00 370/311 |
| 8,073,075 | B2 * | 12/2011 | Matsuoka | ............. H03F 1/0211 348/723 |
| 8,768,396 | B2 * | 7/2014 | Guo | .................... H04W 52/325 455/522 |

(Continued)

FOREIGN PATENT DOCUMENTS

| | | |
|---|---|---|
| CN | 101765191 A | 6/2010 |
| CN | 102045823 A | 5/2011 |
| WO | 2013/134950 A1 | 9/2013 |

*Primary Examiner* — Dominic Rego

(57) ABSTRACT

Embodiments of the present invention provide a power control method and a device. The power control method provided includes: estimating, by a BS, receiving quality of an uplink channel transmitted by UE, and generating an uplink TPC command, where the UE is configured in a compressed mode, and configuration information in the compressed mode includes a transmission interval and a non-transmission interval; and increasing a current transmit power of the uplink TPC command according to the configuration information of the UE in the compressed mode, and repeatedly transmitting the uplink TPC command to the UE. In the embodiments of the present invention, power control accuracy is increased.

20 Claims, 5 Drawing Sheets

(56) References Cited

U.S. PATENT DOCUMENTS

| | | | | |
|---|---|---|---|---|
| 9,491,717 | B2* | 11/2016 | Kim | H04W 52/34 |
| 2002/0196766 | A1* | 12/2002 | Hwang | H04W 52/56 |
| | | | | 370/342 |
| 2003/0072279 | A1* | 4/2003 | Hamalainen | H04W 52/288 |
| | | | | 370/332 |
| 2003/0119452 | A1* | 6/2003 | Kim | H04W 52/143 |
| | | | | 455/69 |
| 2004/0209638 | A1* | 10/2004 | Beckman | H04W 52/322 |
| | | | | 455/522 |
| 2005/0059423 | A1* | 3/2005 | Koo | H04W 52/12 |
| | | | | 455/522 |
| 2007/0191046 | A1* | 8/2007 | Catreux-Erceg | H04W 52/56 |
| | | | | 455/522 |
| 2009/0285329 | A1* | 11/2009 | Matsuoka | H03F 1/0205 |
| | | | | 375/297 |
| 2010/0069110 | A1* | 3/2010 | Lee | H04B 7/15528 |
| | | | | 455/522 |
| 2011/0044296 | A1* | 2/2011 | Zhang | H04B 7/0404 |
| | | | | 370/336 |
| 2011/0053631 | A1* | 3/2011 | Bottomley | H04W 52/08 |
| | | | | 455/522 |
| 2012/0039327 | A1* | 2/2012 | Yang | H04W 36/385 |
| | | | | 370/342 |
| 2012/0044912 | A1* | 2/2012 | Xu | H04W 52/146 |
| | | | | 370/335 |
| 2013/0223545 | A1* | 8/2013 | Zhang | H04W 52/0206 |
| | | | | 375/259 |
| 2013/0258895 | A1* | 10/2013 | Kim | H04J 11/0056 |
| | | | | 370/252 |
| 2014/0146750 | A1* | 5/2014 | Kim | H04W 52/146 |
| | | | | 370/328 |

\* cited by examiner

POWER CONTROL METHOD AND DEVICE

CROSS-REFERENCE TO RELATED APPLICATIONS

This application is a continuation of International Patent Application No. PCT/CN2014/073632 filed on Mar. 18, 2014, which is hereby incorporated by reference in the entirety.

TECHNICAL FIELD

Embodiments of the present invention relate to communications technologies, and in particular, to a power control method and device.

BACKGROUND

In a Universal Mobile Telecommunications System (UMTS for short) network specified by the $3^{rd}$ Generation Partnership Project (3GPP for short), a High Speed Downlink Packet Access (HSDPA for short) technology and a High Speed Uplink Packet Access (HSUPA for short) technology are generally used to reduce user data transmission delay and increase signal quality at a receive end of the UMTS network.

Currently, during uplink power control, a base station (BS for short) transmits an uplink transmit power control (TPC for short) command to user equipment (UE for short) to increase or decrease an uplink transmit power. Alternatively, during downlink power control, a UE transmits a downlink TPC command to a BS to increase or decrease a downlink transmit power. Generally, a same uplink/downlink TPC command may be transmitted in N timeslots, and a receive end combines the TPC commands transmitted in the N timeslots and then makes a judgment to determine whether to adjust a transmit power at a transmit end.

However, when a TPC command is transmitted in a compressed mode, because a TPC command that falls in a transmission interval is not transmitted, Quality of the TPC command received by a receive end deteriorates, and a bit error rate (BER for short) of the TPC command further increases.

SUMMARY

Embodiments of the present invention provide a power control method and device to resolve a problem that quality of a TPC command received by a receive end deteriorates because a TPC command that falls in a transmission interval is not transmitted during TPC-command transmission in a compressed mode.

According to a first aspect, an embodiment of the present invention provides a power control method, including:

estimating, by a base station BS, receiving quality of an uplink channel transmitted by user equipment UE, and generating an uplink transmit power control TPC command, where the UE is configured in a compressed mode, and configuration information in the compressed mode includes a transmission interval and a non-transmission interval; and increasing a current transmit power of the uplink TPC command according to the configuration information of the UE in the compressed mode, and repeatedly transmitting the uplink TPC command to the UE.

In a first possible implementation manner of the first aspect, the increasing a current transmit power of the uplink TPC command according to the configuration information in the compressed mode and repeatedly transmitting the uplink TPC command to the UE includes:

according to a quantity of uplink TPC commands whose transmit timeslots fall in the transmission interval, increasing the transmit power of the uplink TPC command to:

$$P'(k) = \frac{N}{N-M} * P(k),$$

where P'(k) is an increased transmit power of the uplink TPC command, P(k) is a current transmit power of the uplink TPC command, N is a quantity of repeatedly transmitted uplink TPC commands, and M is the quantity of uplink TPC commands whose transmit timeslots fall in the transmission interval; and repeatedly transmitting the uplink TPC command to the UE according to the increased transmit power P'(k).

According to the first aspect or the first possible implementation manner of the first aspect, in a second possible implementation manner, the uplink TPC command is transmitted through a downlink dedicated physical control channel DPCCH or a downlink fractional dedicated physical channel F-DPCH.

According to the first aspect and any one of the first to the second possible implementation manners of the first aspect, in a third possible implementation manner, when the uplink TPC command is transmitted through the downlink F-DPCH, a target value of receiving quality of the downlink F-DPCH is increased to N/(N−M) times accordingly.

According to the first aspect and any one of the first to the third possible implementation manners of the first aspect, in a fourth possible implementation manner, the receiving quality of the uplink channel includes a signal-to-interference ratio SIR, a signal-to-noise ratio SNR, or a signal-to-interference-plus-noise ratio SINR for receiving the uplink channel.

According to the first aspect and any one of the first to the fourth possible implementation manners of the first aspect, in a fifth possible implementation manner, before the estimating, by a base station BS, receiving quality of an uplink channel transmitted by user equipment UE, the method further includes:

receiving configuration information of the UE delivered by a radio network controller RNC, where the configuration information of the UE includes the configuration information of the UE configured in the compressed mode.

According to a second aspect, an embodiment of the present invention provides a power control method, including:

transmitting, by user equipment UE configured in a compressed mode, an uplink channel to a base station BS, where configuration information in the compressed mode includes a transmission interval and a non-transmission interval, so that the BS generates an uplink transmit power control TPC command by estimating receiving quality of the uplink channel transmitted by the UE, increases a current transmit power of the uplink TPC command according to the configuration information of the UE in the compressed mode, and transmits repeatedly the uplink TPC command to the UE according to the increased transmit power; and receiving the uplink TPC command transmitted repeatedly by the BS.

In a first possible implementation manner of the second aspect, the increased transmit power of the uplink TPC command is obtained by the BS according to a quantity of uplink TPC commands whose transmit timeslots fall in the transmission interval, and the increased transmit power of the uplink TPC command is:

$$P'(k) = \frac{N}{N-M} * P(k),$$

where P(k) is a current transmit power of the uplink TPC command, N is a quantity of repeatedly transmitted uplink TPC commands, and M is the quantity of uplink TPC commands whose transmit timeslots fall in the transmission interval.

According to the second aspect or the first possible implementation manner of the second aspect, in a second possible implementation manner, the uplink TPC command is transmitted through a downlink dedicated physical control channel DPCCH or a downlink fractional dedicated physical channel F-DPCH.

According to the second aspect and any one of the first to the second possible implementation manners of the second aspect, in a third possible implementation manner, when the uplink TPC command is transmitted through the downlink F-DPCH, before the receiving the uplink TPC command transmitted repeatedly by the BS, the method further includes:

increasing a target value of receiving quality of the downlink F-DPCH to N/(N−M) times accordingly.

According to a third aspect, an embodiment of the present invention provides a power control method, including:

estimating, by user equipment UE, receiving quality of a downlink channel transmitted by a base station BS, and generating a downlink transmit power control TPC command, where the BS is configured in a compressed mode, and configuration information in the compressed mode includes a transmission interval and a non-transmission interval; and increasing a current transmit power of the downlink TPC command according to the configuration information of the BS in the compressed mode, and repeatedly transmitting the downlink TPC command to the BS.

In a first possible implementation manner of the third aspect, the increasing a current transmit power of the downlink TPC command according to the configuration information of the BS in the compressed mode and repeatedly transmitting the downlink TPC command to the BS includes:

according to a quantity of downlink TPC commands whose transmit timeslots fall in the transmission interval, increasing the transmit power of the downlink TPC command to:

$$P'(k) = \frac{N}{N-M} * P(k),$$

where P'(k) is an increased transmit power of the downlink TPC command, P(k) is a current transmit power of the downlink TPC command, N is a quantity of repeatedly transmitted downlink TPC commands, and M is the quantity of downlink TPC commands whose transmit timeslots fall in the transmission interval; and repeatedly transmitting the downlink TPC command to the BS according to the increased transmit power P'(k).

According to the third aspect or the first possible implementation manner of the third aspect, in a second possible implementation manner, the downlink TPC command is transmitted through an uplink dedicated physical control channel DPCCH.

According to the third aspect and any one of the first to the second possible implementation manners of the third aspect, in a third possible implementation manner, the receiving quality of the downlink channel includes a signal-to-interference ratio SIR, a signal-to-noise ratio SNR, or a signal-to-interference-plus-noise ratio SINR for receiving the downlink channel.

According to the third aspect and any one of the first to third possible implementation manners of the third aspect, in a fourth possible implementation manner, before the estimating, by user equipment UE, receiving quality of a downlink channel transmitted by a base station BS, the method further includes:

receiving configuration information of the BS delivered by a radio network controller RNC, where the configuration information of the BS includes the configuration information of the BS configured in the compressed mode.

According to a fourth aspect, an embodiment of the present invention provides a power control method, including:

transmitting, by a base station BS configured in a compressed mode, a downlink channel to user equipment UE, where configuration information in the compressed mode includes a transmission interval and a non-transmission interval, so that the UE generates a downlink transmit power control TPC command by estimating receiving quality of the downlink channel transmitted by the BS, increases a current transmit power of the downlink TPC command according to the configuration information of the BS in the compressed mode, and transmits repeatedly the downlink TPC command to the BS according to the increased transmit power; and receiving the downlink TPC command transmitted repeatedly by the UE.

In a first possible implementation manner of the fourth aspect, the increased transmit power of the downlink TPC command is obtained by the UE according to a quantity of downlink TPC commands whose transmit timeslots fall in the transmission interval, and the increased transmit power of the downlink TPC command is:

$$P'(k) = \frac{N}{N-M} * P(k),$$

where P(k) is a current transmit power of the downlink TPC command, N is a quantity of repeatedly transmitted downlink TPC commands, and M is the quantity of downlink TPC commands whose transmit timeslots fall in the transmission interval.

According to the fourth aspect or the first possible implementation manner of the fourth aspect, in a second possible implementation manner, the downlink TPC command is transmitted through an uplink dedicated physical control channel DPCCH.

According to a fifth aspect, an embodiment of the present invention provides a base station, including:

a generation module, configured to estimate receiving quality of an uplink channel transmitted by user equipment UE, and generate an uplink transmit power control TPC command, where the UE is configured in a compressed mode, and configuration information in the compressed mode includes a transmission interval and a non-transmission interval; and a transmission module, configured to increase a current transmit power of the uplink TPC command according to the configuration information of the UE in the compressed mode, and repeatedly transmit the uplink TPC command to the UE.

In a first possible implementation manner of the fifth aspect, the transmission module includes:

a processing unit, configured to: according to a quantity of uplink TPC commands whose transmit timeslots fall in the transmission interval, increase the transmit power of the uplink TPC command to:

$$P'(k) = \frac{N}{N-M} * P(k),$$

where P'(k) is an increased transmit power of the uplink TPC command, P(k) is a current transmit power of the uplink TPC command, N is a quantity of repeatedly transmitted uplink TPC commands, and M is the quantity of uplink TPC commands whose transmit timeslots fall in the transmission interval; and a transmission unit, configured to repeatedly transmit the uplink TPC command to the UE according to the increased transmit power P'(k).

According to the fifth aspect or the first possible implementation manner of the fifth aspect, in a second possible implementation manner, the uplink TPC command transmitted by the transmission module is transmitted through a downlink dedicated physical control channel DPCCH or a downlink fractional dedicated physical channel F-DPCH.

According to the fifth aspect and any one of the first to second possible implementation manners of the fifth aspect, in a third possible implementation manner, when the uplink TPC command is transmitted through the downlink F-DPCH, a target value of receiving quality of the downlink F-DPCH is increased to N/(N−M) times accordingly.

According to the fifth aspect and any one of the first to third possible implementation manners of the fifth aspect, in a fourth possible implementation manner, the receiving quality of the uplink channel includes a signal-to-interference ratio SIR, a signal-to-noise ratio SNR, or a signal-to-interference-plus-noise ratio SINR for receiving the uplink channel.

According to the fifth aspect and any one of the first to fourth possible implementation manners of the fifth aspect, in a fifth possible implementation manner, the base station further includes a receiving module, configured to: before the generation module estimates the receiving quality of the uplink channel transmitted by the user equipment UE, receive configuration information of the UE delivered by a radio network controller RNC, where the configuration information of the UE includes the configuration information of the UE configured in the compressed mode.

According to a sixth aspect, an embodiment of the present invention provides user equipment configured in a compressed mode, where the user equipment UE includes:

a transmission module, configured to transmit an uplink channel to a base station BS, where configuration information in the compressed mode includes a transmission interval and a non-transmission interval, so that the BS generates an uplink transmit power control TPC command by estimating receiving quality of the uplink channel transmitted by the UE, increases a current transmit power of the uplink TPC command according to the configuration information of the UE in the compressed mode, and transmits repeatedly the uplink TPC command to the UE according to the increased transmit power; and a receiving module, configured to receive the uplink TPC command transmitted repeatedly by the BS.

In a first possible implementation manner of the sixth aspect, the increased transmit power of the uplink TPC command is obtained by the BS according to a quantity of uplink TPC commands whose transmit timeslots fall in the transmission interval, and the increased transmit power of the uplink TPC command is:

$$P'(k) = \frac{N}{N-M} * P(k),$$

where P(k) is a current transmit power of the uplink TPC command, N is a quantity of repeatedly transmitted uplink TPC commands, and M is the quantity of uplink TPC commands whose transmit timeslots fall in the transmission interval.

According to the sixth aspect or the first possible implementation manner of the sixth aspect, in a second possible implementation manner, the uplink TPC command received by the receiving module is transmitted through a downlink dedicated physical control channel DPCCH or a downlink fractional dedicated physical channel F-DPCH.

According to the sixth aspect and any one of the first to the second possible implementation manners of the sixth aspect, in a third possible implementation manner, when the uplink TPC command is transmitted through the downlink F-DPCH, the device further includes a processing module, configured to: before the receiving module receives the uplink TPC command transmitted repeatedly by the BS, increase a target value of receiving quality of the downlink F-DPCH to N/(N−M) times accordingly.

According to a seventh aspect, an embodiment of the present invention provides user equipment, including:

a generation module, configured to estimate receiving quality of a downlink channel transmitted by a base station BS, and generate a downlink transmit power control TPC command, where the BS is configured in a compressed mode, and configuration information in the compressed mode includes a transmission interval and a non-transmission interval; and a transmission module, configured to increase a current transmit power of the downlink TPC command according to the configuration information of the BS in the compressed mode, and repeatedly transmit the downlink TPC command to the BS.

In a first possible implementation manner of the seventh aspect, the transmission module includes:

a processing unit, configured to: according to a quantity of downlink TPC commands whose transmit timeslots fall in the transmission interval, increase the transmit power of the downlink TPC command to:

$$P'(k) = \frac{N}{N-M} * P(k),$$

where P'(k) is an increased transmit power of the downlink TPC command, P(k) is a current transmit power of the downlink TPC command, N is a quantity of repeatedly transmitted downlink TPC commands, and M is the quantity of downlink TPC commands whose transmit timeslots fall in the transmission interval; and a transmission unit, configured to repeatedly transmit the downlink TPC command to the BS according to the increased transmit power P'(k).

According to the seventh aspect or the first possible implementation manner of the seventh aspect, in a second possible implementation manner, the downlink TPC command transmitted by the transmission module is transmitted through an uplink dedicated physical control channel DPCCH.

According to the seventh aspect and any one of the first to the second possible implementation manners of the seventh aspect, in a third possible implementation manner, the receiving quality of the downlink channel includes a signal-to-interference ratio SIR, a signal-to-noise ratio SNR, or a signal-to-interference-plus-noise ratio SINR for receiving the downlink channel.

According to the seventh aspect and any one of the first to the third possible implementation manners of the seventh aspect, in a fourth possible implementation manner, the UE further includes a receiving module, configured to: before the generation module estimates the receiving quality of the downlink channel transmitted by the base station BS, receive configuration information of the BS delivered by a radio network controller RNC, where the configuration information of the BS includes the configuration information of the UE configured in the compressed mode.

According to an eighth aspect, an embodiment of the present invention provides a base station configured in a compressed mode, where the base station BS includes:

a transmission module, configured to transmit a downlink channel to user equipment UE, where configuration information in the compressed mode includes a transmission interval and a non-transmission interval, so that the UE generates a downlink transmit power control TPC command by estimating receiving quality of the downlink channel transmitted by the BS, increases a current transmit power of the downlink TPC command according to the configuration information of the BS in the compressed mode, and transmits repeatedly the downlink TPC command to the BS according to the increased transmit power; and a receiving module, configured to receive the downlink TPC command transmitted repeatedly by the UE.

In a first possible implementation manner of the eighth aspect, the increased transmit power of the downlink TPC command is obtained by the UE according to a quantity of downlink TPC commands whose transmit timeslots fall in the transmission interval, and the increased transmit power of the downlink TPC command is:

$$P'(k) = \frac{N}{N-M} * P(k),$$

where P(k) is a current transmit power of the downlink TPC command, N is a quantity of repeatedly transmitted downlink TPC commands, and M is the quantity of downlink TPC commands whose transmit timeslots fall in the transmission interval.

According to the eighth aspect or the first possible implementation manner of the eighth aspect, in a second possible implementation manner, the downlink TPC command received by the receiving module is transmitted through an uplink dedicated physical control channel DPCCH.

According to the power control method and device provided in the embodiments of the present invention, a receive end generates a TPC command by estimating receiving quality of an uplink channel transmitted by a transmit end configured in a compressed mode, and according to configuration information of the transmit end in the compressed mode, transmits repeatedly the TPC command to the transmit end in a manner of increasing a transmit power. In this way, energy of the TPC command received by the receive end configured in the compressed mode is the same as that configured in a normal mode, a problem is resolved that quality of a TPC command received by a receive end deteriorates because a TPC command that falls in a transmission interval is not transmitted during TPC-command transmission in a compressed mode, and power control accuracy is increased accordingly.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Embodiment 1

Figure 1:
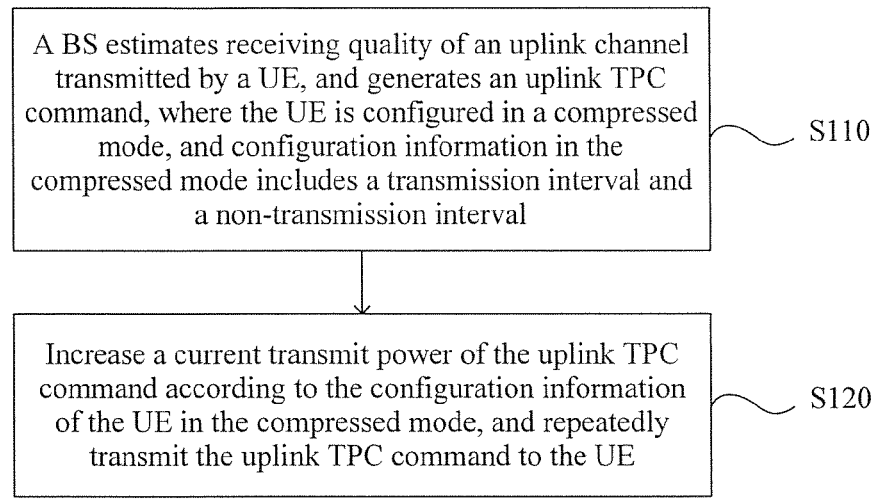
FIG. 1 is a flowchart of a power control method according to Embodiment 1 of the present invention.

FIG. 1 is a flowchart of a power control method according to Embodiment 1 of the present invention. The method in this embodiment is applicable to a case in which a transmit power of a TPC command between a BS and a UE is adjusted. The method may be executed by a BS. The BS is generally implemented in a manner of hardware and software, which maybe integrated in a memory of the BS, for example, integrated in a processor chip, so as to be invoked and executed by a processor. The method in this embodiment includes the following steps:

S110. The BS estimates receiving quality of an uplink channel transmitted by the UE, and generates an uplink TPC command, where the UE is configured in a compressed mode, and configuration information in the compressed mode includes a transmission interval and a non-transmission interval.

In a UMTS network, during data exchange between a BS and a UE, to overcome impact caused by channel attenuation on data transmission, channel estimation is generally performed according to whether receiving quality remains stable when a signal arrives at a receive end. For a receive end whose receiving quality does not meet a preset requirement, a transmit power at a transmit end may be adjusted in a power control manner, so that the receiving quality at the receive end meets a preset target.

In this embodiment, uplink power control is used as an example for description, and the UE transmits uplink data, control information of the data, and the like to the BS. Generally, the uplink data is transmitted through an uplink channel. The uplink power control described in this embodiment is power control performed on the uplink channel. Specially, the UE in this embodiment is configured in the compressed mode. In specific implementation, before S110, the method further includes: receiving configuration information of the UE delivered by a radio network controller (RNC for short). The configuration information of the UE specifically includes the configuration information of the UE configured in the compressed mode. During channel estimation, to perform inter-frequency measurement or inter-system measurement, transmission on current working frequency may be generally disabled in several periods to provide time for the UE to perform measurement. This working mode is a compressed mode. In the compressed mode, frames may be compressed according to a compressed pattern, and the configuration information of the UE includes a transmission interval and a non-transmission interval. A channel transmission manner in the non-transmission interval is the same as that in a normal mode. In a downlink transmission interval, a downlink dedicated physical control channel (DPCCH for short), a downlink dedicated physical data channel (DPDCH for short), and a downlink fractional dedicated physical channel (F-DPCH for short) are not transmitted. In an uplink transmission interval, neither an uplink DPCCH nor an uplink DPDCH is transmitted.

In this embodiment, a receive end, that is, the BS, can measure, according to the received uplink data, receiving quality of the uplink channel for transmitting the data. The receiving quality may include one of a signal-to-interference ratio (SIR for short), or a signal-to-noise ratio (SNR for short), or a signal-to-interference-plus-noise ratio (SINR for short) for receiving the uplink channel. Accordingly, an uplink target value compared with the SIR, the SNR or the SINR may be $SIR_{target}$, $SNR_{target}$ or $SINR_{target}$. The BS determines to generate an uplink TPC command according to an offset between the receiving quality of the uplink channel and a corresponding uplink target value. The uplink TPC command transmitted to the UE generally includes increase (Up) or decrease (Down). Generally, during the uplink power control, the BS transmits the uplink TPC command to the UE to increase or decrease an uplink transmit power at a UE end.

S120. Increase a current transmit power of the uplink TPC command according to the configuration information of the UE in the compressed mode, and repeatedly transmit the uplink TPC command to the UE.

Currently, the uplink TPC command is generally transmitted in the following manner: The BS transmits the same TPC command in each of N timeslots, that is, transmits repeatedly N uplink TPC commands. The UE combines the N uplink TPC commands and then makes a judgment to determine whether to adjust a channel transmit power of the UE. Because the N uplink TPC commands are the same, energy of the uplink TPC commands received by the UE should be N times. Further, the transmit power of the uplink channel is adjusted according to the energy of the received uplink TPC commands. However, when the UE is configured in the compressed mode, some of the N repeatedly transmitted uplink TPC commands may fall in a downlink transmission interval, that is, the uplink TPC commands that fall in the downlink transmission interval are not transmitted. Therefore, energy of uplink TPC commands received at the receive end, that is, at the UE side, is lower than that in normal configuration. Consequently, the receiving quality of the uplink TPC command cannot be ensured. In this embodiment, because the BS in the network has learned of the configuration mode of the UE and the configuration information of the UE, the uplink TPC commands whose transmit timeslots fall in the transmission interval can be determined according to allocation ratio of the transmission interval and the non-transmission interval in the compressed pattern. Further, the transmit power of the uplink TPC commands is increased, that is, the energy of the uplink TPC commands received repeatedly by the UE increases accordingly. A problem in the prior art is avoided that quality of an uplink TPC command received by a UE deteriorates because an uplink TPC command that falls in a transmission interval is not transmitted.

According to the power control method provided in this embodiment, a BS generates an uplink TPC command by estimating receiving quality of an uplink channel transmitted by a UE, and according to configuration information of the UE in a compressed mode, transmits repeatedly the uplink TPC command to the UE in a manner of increasing a transmit power. In this way, energy of the uplink TPC command received by the UE configured in the compressed mode is the same as that configured in a normal mode, a problem is resolved that quality of a TPC command received by a receive end deteriorates because a TPC command that falls in a transmission interval is not transmitted during TPC-command transmission in a compressed mode, and power control accuracy is increased accordingly.

Further, according to the power control method provided in this embodiment, because the BS has learned of the allocation ratio of the transmission interval to the non-transmission interval, S120 may specifically include: according to a quantity of uplink TPC commands whose transmit timeslots fall in the transmission interval, increasing the transmit power of the uplink TPC command to:

$$P'(k) = \frac{N}{N-M} * P(k). \quad (1)$$

In the foregoing formula (1), P'(k) is an increased transmit power of the uplink TPC command, P(k) is a current transmit power of the uplink TPC command, N is a quantity of repeatedly transmitted uplink TPC commands, and M is the quantity of uplink TPC commands whose transmit timeslots fall in the transmission interval. Further, according to the increased transmit power P'(k), the uplink TPC command is repeatedly transmitted to the UE.

By using the foregoing prior art as an example for description, the BS transmits the same uplink TPC command in each of N timeslots, that is, transmits repeatedly N uplink TPC commands. However, the UE in this embodiment is configured in the compressed mode. For example, when M (M<N) of the N uplink TPC commands exactly fall in the downlink transmission interval, the M uplink TPC commands are not transmitted, and the BS transmits only N−M uplink TPC commands to the UE in the N timeslots. That is, energy of the uplink TPC commands received by the UE is also N−M times instead of normally N times. Therefore, after the transmit power of the uplink TPC commands is increased to N/(N−M) times, the energy of the uplink TPC commands received by the UE is also N times, and is the same as the energy of the uplink TPC commands received in the normal mode, that is, the receiving quality of the uplink TPC command is ensured.

Optionally, the uplink TPC command transmitted by the BS to the UE may be transmitted through a downlink DPCCH or a downlink F-DPCH. In a case in which the uplink TPC command is transmitted through the downlink DPCCH, because the downlink DPCCH includes a pilot field and a TPC field, the UE may perform downlink power control according to receiving quality of the pilot field, and increasing the transmit power of the TPC field does not affect downlink power control.

It should be noted that in a case in which the uplink TPC command is transmitted through the downlink F-DPCH, because the downlink F-DPCH has only a TPC field, the UE performs downlink power control according to receiving quality of the TPC field, and feeds back a downlink TPC per timeslot. Further, after the BS increases the transmit power of the uplink TPC, that is, a transmit power of the downlink F-DPCH, the receiving quality such as the SIR at the UE end is higher than usual, but the downlink $SIR_{target}$ compared with the receiving quality remains unchanged. The UE may instruct the BS to decrease the transmit power of the downlink F-DPCH. Consequently, the increasing a transmit power of the uplink TPC command in S120 in this embodiment is futile. In specific implementation, when the UE is configured in the compressed mode, the target value of the receiving quality of the downlink F-DPCH may be increased by the UE to N/(N−M) times accordingly. For example, $SIR_{target}$ may be increased to $N*SIR_{target}/(N-M)$. According to the power control method provided in this embodiment of the present invention, in a case in which uplink TPC commands are transmitted through different downlink channels, power control adaptable to a current transmit channel is provided for transmission, receiving quality of the uplink TPC commands is ensured, energy of a combined uplink TPC command is the same as energy in a normal mode, and further, accuracy of determining and performing power control is ensured.

Embodiment 2

Figure 2:
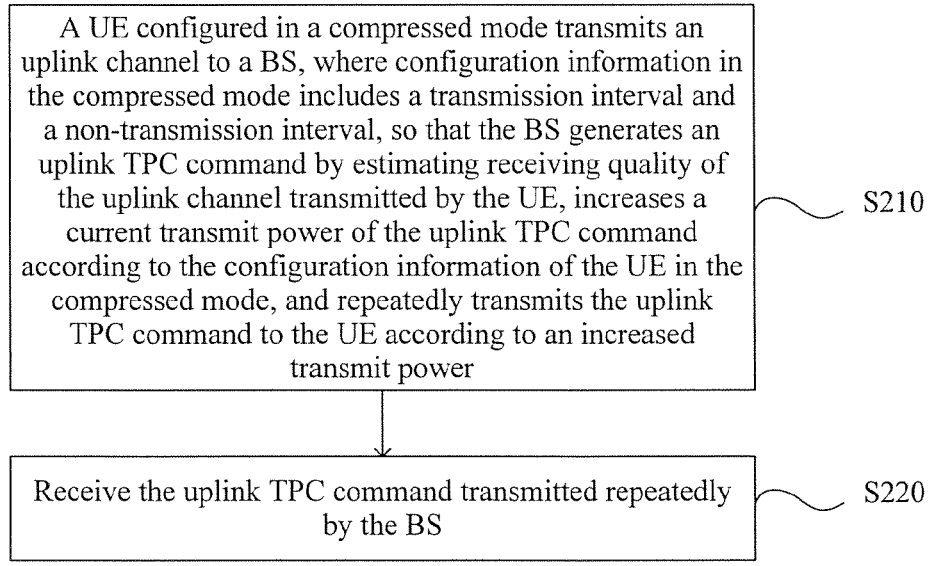
FIG. 2 is a flowchart of a power control method according to Embodiment 2 of the present invention.

FIG. 2 is a flowchart of a power control method according to Embodiment 2 of the present invention. The method in this embodiment is applicable to a case in which a transmit power of a TPC command between a BS and a UE is adjusted. The method may be executed by a UE. The UE is generally implemented in a manner of hardware and software, which may be integrated in a memory of the UE, for example, integrated in a processor chip, so as to be invoked and executed by a processor. The method in this embodiment includes the following steps:

S210. The UE configured in a compressed mode transmits an uplink channel to the BS, where configuration information in the compressed mode includes a transmission interval and a non-transmission interval, so that the BS generates an uplink TPC command by estimating receiving quality of the uplink channel transmitted by the UE, increases a current transmit power of the uplink TPC command according to the configuration information of the UE in the compressed mode, and transmits repeatedly the uplink TPC command to the UE according to an increased transmit power.

In this embodiment, uplink power control is also used as an example for description, and the UE transmits uplink data, control information of the data, and the like to the BS. Generally, the uplink data is transmitted through an uplink channel. The uplink power control described in this embodiment is power control performed on the uplink channel. Specially, the UE in this embodiment is configured in the compressed mode. Generally, the UE knows the configuration information of the UE. During channel estimation, to perform inter-frequency measurement or inter-system measurement, transmission on current working frequency may be disabled in several periods to provide time for the UE to perform measurement. This working mode is a compressed mode. In the compressed mode, frames may be compressed according to a compressed pattern, and the configuration information of the UE includes a transmission interval and a non-transmission interval. Transmission manners in the transmission interval and the non-transmission interval have been described in the foregoing embodiment, and details are not described herein.

In this embodiment, after the UE transmits the uplink data to the BS, the BS measures, according to the received uplink data, receiving quality of the uplink channel for transmitting the data, and specifically determines, by comparing the receiving quality and a target value, whether the uplink TPC command is increase or decrease. Generally, the receiving quality may include one of an SIR, an SNR, or an SINR for receiving the uplink channel. Accordingly, an uplink target value compared with the SIR, the SNR, or the SINR may be $SIR_{target}$, $SNR_{target}$, or $SINR_{target}$. Further, an uplink TPC command whose transmit timeslot falls in the transmission interval is determined according to the configuration information of the UE in the compressed mode, and further, a transmit power of the uplink TPC command is increased. In this way, the to-be-transmitted uplink TPC command is repeatedly transmitted by using the increased transmit power.

S220. Receive the uplink TPC command transmitted repeatedly by the BS.

A manner of transmitting the uplink TPC command in the prior art has been described in the foregoing embodiment, and details are not described herein. The UE in this embodiment is configured in the compressed mode, some of the N repeatedly received uplink TPC commands may fall in a downlink transmission interval, that is, the uplink TPC commands that fall in the downlink transmission interval are not transmitted. Therefore, energy of uplink TPC commands received at a receive end, that is, at the UE side, is lower than that in normal configuration. Consequently, the receiving quality of the uplink TPC command cannot be ensured. It should be noted that when a network connection is established, the BS may acquire the configuration mode of the UE and the configuration information of the UE by using an RNC. Therefore, according to allocation ratio of the transmission interval and the non-transmission interval in the compressed pattern, the BS can determine the uplink TPC commands whose transmit timeslots fall in the transmission interval. Then, after the uplink TPC command is repeatedly transmitted to the UE by using the increased transmit power of the uplink TPC command, the energy of the uplink TPC commands received repeatedly by the UE increases accordingly. A problem in the prior art is avoided that quality of an uplink TPC command received by a UE deteriorates because an uplink TPC command that falls in a transmission interval is not transmitted.

According to the power control method provided in this embodiment, a UE configured in a compressed mode transmits an uplink channel to a BS, so that the BS generates an uplink TPC command by estimating receiving quality of the uplink channel, and according to configuration information of the UE in the compressed mode, transmits repeatedly the uplink TPC command to the UE in a manner of increasing a transmit power. In this way, energy of the uplink TPC command received by the UE configured in the compressed mode is the same as that configured in a normal mode, a problem is resolved that quality of a TPC command received by a receive end deteriorates because a TPC command that falls in a transmission interval is not transmitted during TPC-command transmission in a compressed mode, and power control accuracy is increased accordingly.

Further, according to the power control method provided in this embodiment, the BS can learn of an allocation ratio of the transmission interval to the non-transmission interval from the RNC. Specifically, the increased transmit power of the uplink TPC command is obtained by the BS according to a quantity of uplink TPC commands whose transmit timeslots fall in the transmission interval, and the increased transmit power of the uplink TPC command is:

$$P'(k) = \frac{N}{N-M} * P(k). \quad (2)$$

In the foregoing formula (2), P(k) is a current transmit power of the uplink TPC command, N is a quantity of repeatedly transmitted uplink TPC commands, and M is the quantity of uplink TPC commands whose transmit timeslots fall in the transmission interval.

The manner of increasing the transmit power of the uplink TPC command in this embodiment is the same as that in the foregoing embodiment. After the transmit power of the uplink TPC commands is increased to N/(N−M) times, the energy of the uplink TPC commands received by the UE is N times, and is the same as the energy of the uplink TPC commands received in the normal mode, that is, the receiving quality of the uplink TPC command is ensured.

Optionally, the uplink TPC command may be transmitted through a downlink DPCCH or a downlink F-DPCH. In a case in which the uplink TPC command is transmitted through the downlink DPCCH, because the downlink DPCCH includes a pilot field and a TPC field, the UE may perform downlink power control according to receiving quality of the pilot field, and increasing the transmit power of the TPC field does not affect downlink power control.

It should be noted that in a case in which the uplink TPC command is transmitted through the downlink F-DPCH, because the downlink F-DPCH has only a TPC field, the UE performs downlink power control according to receiving quality of the TPC field, and feeds back a downlink TPC per timeslot. Further, after the BS increases the transmit power of the uplink TPC, that is, a transmit power of the downlink F-DPCH, the receiving quality such as the SIR at the UE end is higher than usual, but the downlink $SIR_{target}$ compared with the receiving quality remains unchanged. The UE may instruct the BS to decrease the transmit power of the downlink F-DPCH. Consequently, increasing the transmit power of the uplink TPC command by the BS in this embodiment is futile. Therefore, before S220, the method provided in this embodiment further includes: increasing a target value of receiving quality of the downlink F-DPCH to N/(N−M) times accordingly. According to the power control method provided in this embodiment of the present invention, in a case in which uplink TPC commands are transmitted through different downlink channels, power control adaptable to a current transmit channel is provided for transmission, receiving quality of the uplink TPC commands is ensured, energy of a combined uplink TPC command is the same as energy in a normal mode, and further, accuracy of determining and performing power control is ensured.

Embodiment 3

Figure 3:
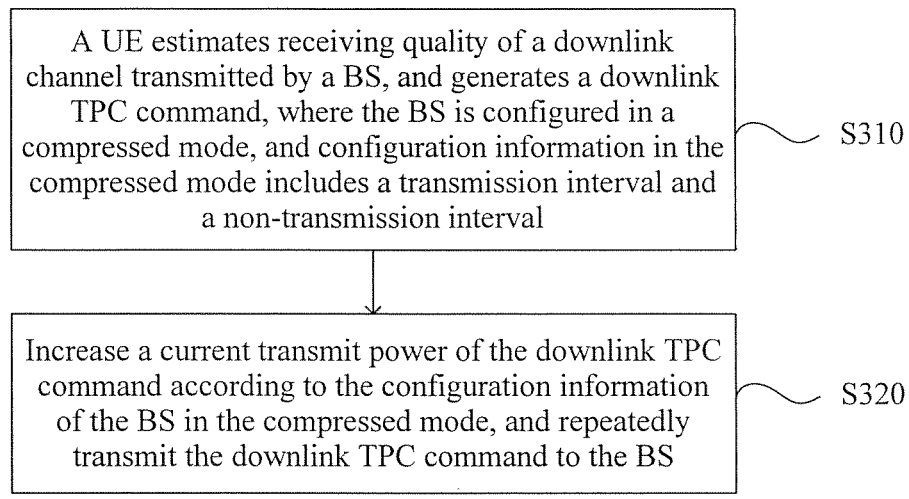
FIG. 3 is a flowchart of a power control method according to Embodiment 3 of the present invention.

FIG. 3 is a flowchart of a power control method according to Embodiment 3 of the present invention. The method in this embodiment is applicable to a case in which a transmit power of a TPC command between a BS and a UE is adjusted. The method may be executed by a UE. The UE is generally implemented in a manner of hardware and software, which may be integrated in a memory of the UE, for example, integrated in a processor chip, so as to be invoked and executed by a processor. The method in this embodiment includes the following steps:

S310. The UE estimates receiving quality of a downlink channel transmitted by the BS, and generates a downlink TPC command, where the BS is configured in a compressed mode, and configuration information in the compressed mode includes a transmission interval and a non-transmission interval.

In a UMTS network, during data exchange between a BS and a UE, to overcome impact caused by channel attenuation on data transmission, channel estimation is generally performed according to whether receiving quality remains stable when a signal arrives at a receive end. For a receive end whose receiving quality does not meet a preset requirement, a transmit power at a transmit end may be adjusted in a power control manner, so that the receiving quality at the receive end meets a preset target.

In this embodiment, downlink power control is used as an example for description, and the BS transmits downlink data, control information of the data, and the like to the UE. Generally, the downlink data is transmitted through a downlink channel. The downlink power control described in this embodiment is power control performed on the downlink channel. Specially, the BS in this embodiment is configured in the compressed mode. In specific implementation, before S310, the method further includes: receiving configuration information of the BS delivered by an RNC, where the configuration information of the BS includes the configuration information of the BS configured in the compressed mode. During channel estimation, to perform inter-frequency measurement or inter-system measurement, transmission on current working frequency may be generally disabled in several periods to provide time for the BS to perform measurement. This working mode is a compressed mode. In the compressed mode, frames may be compressed according to a compressed pattern, and the configuration information of the BS includes a transmission interval and a non-transmission interval. Transmission manners in the transmission interval and the non-transmission interval have been described in the foregoing embodiment, and details are not described herein.

In this embodiment, a receive end, that is, the UE, can measure, according to the received downlink data, receiving quality of the downlink channel for transmitting the data. The receiving quality may include one of an SIR, an SNR, or an SINR for receiving the downlink channel. Accordingly, a downlink target value compared with the SIR, the SNR, or the SINR may be $SIR_{target}$, $SNR_{target}$, or $SINR_{target}$. The UE generates a downlink TPC command according to an offset between the receiving quality of the downlink channel and a corresponding downlink target value. The downlink TPC command generally includes increase or decrease. During the downlink power control, the UE transmits the downlink TPC command to the BS to increase or decrease an uplink transmit power at a BS end.

S320. Increase a current transmit power of the downlink TPC command according to the configuration information of the BS in the compressed mode, and repeatedly transmit the downlink TPC command to the BS.

Currently, the downlink TPC command is generally transmitted in the following manner: The UE transmits the same downlink TPC command in each of N timeslots, that is, transmits repeatedly N downlink TPC commands. The BS combines the N downlink TPC commands and then makes a judgment to determine whether to adjust a channel transmit power of the BS. Because the N downlink TPC commands are the same, energy of the downlink TPC commands received by the BS should be N times. Further, the transmit power of the downlink channel is adjusted according to the energy of the received downlink TPC commands. However, when the BS is configured in the compressed mode, some of the N repeatedly transmitted downlink TPC commands may fall in an uplink transmission interval, that is, the downlink TPC commands that fall in the uplink transmission interval are not transmitted. Therefore, energy of downlink TPC commands received at the receive end, that is, at the BS side, is lower than that in normal configuration. Consequently, the receiving quality of the downlink TPC command cannot be ensured. In this embodiment, because the UE in the network has learned of the configuration mode of the BS and the configuration information of the BS, the downlink TPC commands whose transmit timeslots fall in the transmission interval can be determined according to allocation ratio of the transmission interval and the non-transmission interval in the compressed pattern. After the transmit power of the downlink TPC commands is increased, the energy of the downlink TPC commands received repeatedly by the BS increases accordingly. A problem in the prior art is avoided that quality of a downlink TPC command received by a BS deteriorates because a downlink TPC command that falls in a transmission interval is not transmitted.

According to the power control method provided in this embodiment, a UE generates a downlink TPC command by estimating receiving quality of a downlink channel transmitted by the BS, and according to configuration information of the BS in a compressed mode, transmits repeatedly the downlink TPC command to the BS in a manner of increasing a transmit power. In this way, energy of the downlink TPC command received by the BS configured in the compressed mode is the same as that configured in a normal mode, a problem is resolved that quality of a TPC command received by a receive end deteriorates because a TPC command that falls in a transmission interval is not transmitted during TPC-command transmission in a compressed mode, and power control accuracy is increased accordingly.

Further, according to the power control method provided in this embodiment, because the UE has learned of an allocation ratio of the transmission interval to the non-transmission interval, S320 may specifically include: according to a quantity of downlink TPC commands whose transmit timeslots fall in the transmission interval, increasing the transmit power of the downlink TPC command to:

$$P'(k) = \frac{N}{N-M} * P(k). \quad (3)$$

In the foregoing formula (3), P'(k) is an increased transmit power of the downlink TPC command, P(k) is a current transmit power of the downlink TPC command, N is a quantity of repeatedly transmitted downlink TPC commands, and M is the quantity of downlink TPC commands whose transmit timeslots fall in the transmission interval. Further, according to the increased transmit power P'(k), the downlink TPC command is repeatedly transmitted to the BS.

By using the foregoing prior art as an example for description, the UE transmits the same downlink TPC command in each of N timeslots, that is, transmits repeatedly N downlink TPC commands. However, the BS in this embodiment is configured in the compressed mode. For example, when M (M<N) of the N downlink TPC commands exactly fall in the uplink transmission interval, the M downlink TPC commands are not transmitted, and the UE transmits only N−M downlink TPC commands to the BS in the N timeslots. That is, energy of the downlink TPC commands received by the BS is also N−M times instead of normally N times. Therefore, after the transmit power of the downlink TPC commands is increased to N/(N−M) times, the energy of the downlink TPC commands received by the BS is also N times, and is the same as the energy of the downlink TPC commands received in the normal mode, that is, the receiving quality of the downlink TPC command is ensured.

It should be noted that the downlink TPC command transmitted by the UE to the BS in this embodiment is specifically transmitted through an uplink DPCCH. Because the uplink DPCCH includes a pilot field and a TPC field, the BS may perform uplink power control according to receiving quality of the pilot field, and increasing the transmit power of the TPC field does not affect uplink power control.

Embodiment 4

Figure 4:
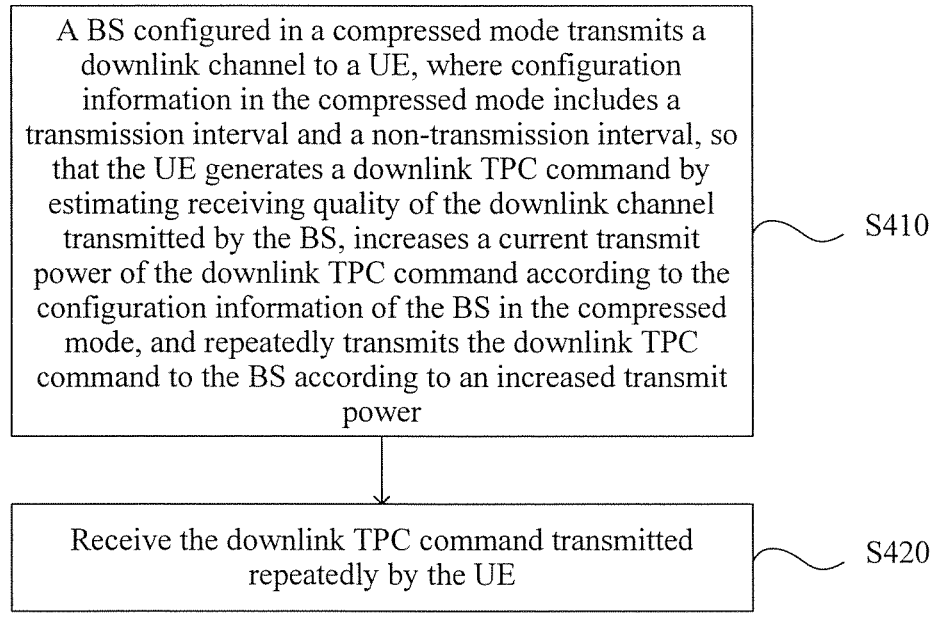
FIG. 4 is a flowchart of a power control method according to Embodiment 4 of the present invention.

FIG. 4 is a flowchart of a power control method according to Embodiment 4 of the present invention. The method in this embodiment is applicable to a case in which a transmit power of a TPC command between a BS and a UE is adjusted. The method may be executed by a BS. The BS is generally implemented in a manner of hardware and software, which may be integrated in a memory of the BS, for example, integrated in a processor chip, so as to be invoked and executed by a processor. The method in this embodiment includes the following steps:

S410. The BS configured in a compressed mode transmits a downlink channel to the UE, where configuration information in the compressed mode includes a transmission interval and a non-transmission interval, so that the UE generates a downlink TPC command by estimating receiving quality of the downlink channel transmitted by the BS, increases a current transmit power of the downlink TPC command according to the configuration information of the BS in the compressed mode, and transmits repeatedly the downlink TPC command to the BS according to an increased transmit power.

In this embodiment, downlink power control is also used as an example for description, and the BS transmits downlink data, control information of the data, and the like to the UE. Generally, the downlink data is transmitted through a downlink channel. The downlink power control described in this embodiment is power control performed on the downlink channel. Specially, the BS in this embodiment is configured in the compressed mode. Generally, the BS knows the configuration information of the BS. During channel estimation, to perform inter-frequency measurement or inter-system measurement, transmission on current working frequency may be disabled in several periods to provide time for the BS to perform measurement. This working mode is a compressed mode. In the compressed mode, frames may be compressed according to a compressed pattern, and the configuration information of the BS includes a transmission interval and a non-transmission interval. Transmission manners in the transmission interval and the non-transmission interval have been described in the foregoing embodiment, and details are not described herein.

In this embodiment, after the BS transmits the downlink data to the UE, the UE measures, according to the received downlink data, receiving quality of the downlink channel for transmitting the data, and specifically determines, by comparing the receiving quality and a target value, whether the downlink TPC command is increase or decrease. Generally, the receiving quality may include one of an SIR, an SNR, or an SINR for receiving the downlink channel. Accordingly, a downlink target value compared with the SIR, the SNR, or the SINR may be $SIR_{target}$, $SNR_{target}$, or $SINR_{target}$. Therefore, a downlink TPC command whose transmit timeslot falls in the transmission interval is determined according to the configuration information of the BS in the compressed mode, and further, a transmit power of the downlink TPC command is increased. In this way, the to-be-transmitted downlink TPC command is repeatedly transmitted by using the increased transmit power.

S420. Receive the downlink TPC command transmitted repeatedly by the UE.

A manner of transmitting the downlink TPC command in the prior art has been described in the foregoing embodiment, and details are not described herein. The BS in this embodiment is configured in the compressed mode, some of the N repeatedly received downlink TPC commands may fall in an uplink transmission interval, that is, the downlink TPC commands that fall in the uplink transmission interval are not transmitted. Therefore, energy of downlink TPC commands received at the receive end, that is, at the BS side, is lower than that in normal configuration. Consequently, the receiving quality of the downlink TPC command cannot be ensured. It should be noted that when a network connection is established, the UE may acquire the configuration mode of the BS and the configuration information of the BS by using an RNC. Therefore, according to allocation ratio of the transmission interval and the non-transmission interval in the compressed pattern, the UE can determine the downlink TPC commands whose transmit timeslots fall in the transmission interval. Then, after the downlink TPC command is repeatedly transmitted to the BS by using the increased transmit power of the downlink TPC command, the energy of the downlink TPC commands received repeatedly by the BS increases accordingly. A problem in the prior art is avoided that quality of a downlink TPC command received by a BS deteriorates because a downlink TPC command that falls in a transmission interval is not transmitted.

According to the power control method provided in this embodiment, a BS configured in a compressed mode transmits a downlink channel to a UE, so that the UE generates a downlink TPC command by estimating receiving quality of the downlink channel, and according to configuration information of the BS in the compressed mode, transmits repeatedly the downlink TPC command to the BS in a manner of increasing a transmit power. In this way, energy of the downlink TPC command received by the BS configured in the compressed mode is the same as that configured in a normal mode, a problem is resolved that quality of a TPC command received by a receive end deteriorates because a TPC command that falls in a transmission interval is not transmitted during TPC-command transmission in a compressed mode, and power control accuracy is increased accordingly.

Further, according to the power control method provided in this embodiment, the UE can learn of an allocation ratio of the transmission interval to the non-transmission interval from the RNC. Specifically, the increased transmit power of the downlink TPC command is obtained by the UE according to a quantity of downlink TPC commands whose transmit timeslots fall in the transmission interval, and the increased transmit power of the downlink TPC command is:

$$P'(k) = \frac{N}{N-M} * P(k). \tag{4}$$

In the foregoing formula (4), P(k) is a current transmit power of the downlink TPC command, N is a quantity of repeatedly transmitted downlink TPC commands, and M is the quantity of downlink TPC commands whose transmit timeslots fall in the transmission interval.

The manner of increasing the transmit power of the downlink TPC command in this embodiment is the same as that in the foregoing embodiment. After the transmit power of the downlink TPC commands is increased to N/(N−M) times, the energy of the downlink TPC commands received by the BS is N times, and is the same as the energy of the downlink TPC commands received in the normal mode, that is, the receiving quality of the downlink TPC command is ensured.

It should be noted that the downlink TPC command transmitted by the UE to the BS in this embodiment is specifically transmitted through an uplink DPCCH. Because the uplink DPCCH includes a pilot field and a TPC field, the BS may perform uplink power control according to receiving quality of the pilot field, and increasing the transmit power of the TPC field does not affect uplink power control.

Embodiment 5

Figure 5:
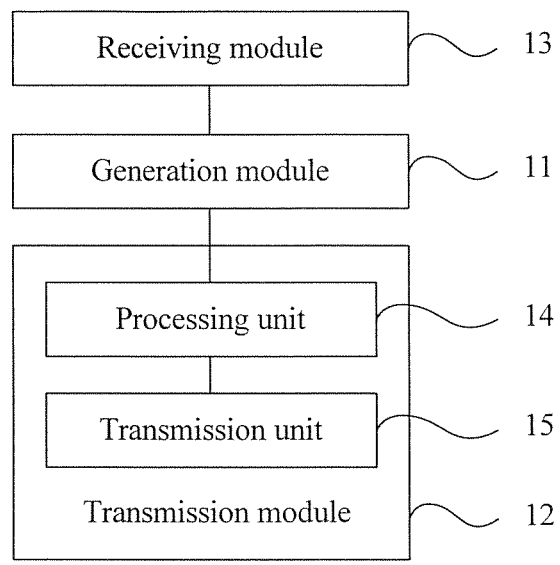
FIG. 5 is a schematic structural diagram of a base station according to Embodiment 5 of the present invention.

FIG. 5 is a schematic structural diagram of a base station according to Embodiment 5 of the present invention. As shown in FIG. 5, the BS provided in this embodiment specifically includes a generation module 11 and a transmission module 12.

The generation module 11 is configured to estimate receiving quality of an uplink channel transmitted by a UE, and generate an uplink transmit power control TPC command, where the UE is configured in a compressed mode, and configuration information in the compressed mode includes a transmission interval and a non-transmission interval.

In this embodiment, the receiving quality of the uplink channel may include a signal-to-interference ratio SIR, a signal-to-noise ratio SNR, or a signal-to-interference-plus-noise ratio SINR for receiving the uplink channel.

The transmission module 12 is configured to increase a current transmit power of the uplink TPC command according to the configuration information of the UE in the compressed mode, and repeatedly transmit the uplink TPC command to the UE.

In specific implementation of this embodiment, the BS may further include a receiving module 13, configured to: before the generation module 11 estimates the receiving quality of the uplink channel transmitted by the UE, receive the configuration information of the UE in the compressed mode, where the configuration information is delivered by an RNC, so as to increase the transmit power of the uplink TPC command according to the configuration information.

The BS provided in this embodiment of the present invention is used to execute the power control method provided in Embodiment 1 of the present invention, and has corresponding functional modules. Implementation principles and technical effects of the BS are similar to those of the power control method, and details are not described herein.

Further, in the BS provided in this embodiment, the transmission module 12 may include a processing unit 14, configured to: according to a quantity of uplink TPC commands whose transmit timeslots fall in the transmission interval, increase the transmit power of the uplink TPC command to:

$$P'(k) = \frac{N}{N-M} * P(k),$$

where P'(k) is an increased transmit power of the uplink TPC command, P(k) is a current transmit power of the uplink TPC command, N is a quantity of repeatedly transmitted uplink TPC commands, and M is the quantity of uplink TPC commands whose transmit timeslots fall in the transmission interval. The transmission unit 15 is configured to repeatedly transmit the uplink TPC command to the UE according to the increased transmit power P'(k).

Optionally, the uplink TPC command transmitted by the transmission module 12 may be transmitted through a downlink DPCCH or a downlink F-DPCH. It should be noted that when the uplink TPC command is transmitted through the downlink F-DPCH, a target value of receiving quality of the downlink F-DPCH is increased to N/(N−M) times accordingly.

Embodiment 6

Figure 6:
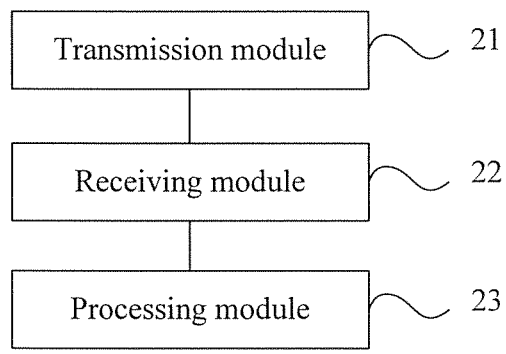
FIG. 6 is a schematic structural diagram of user equipment according to Embodiment 6 of the present invention.

FIG. 6 is a schematic structural diagram of user equipment according to Embodiment 6 of the present invention. As shown in FIG. 6, the UE provided in this embodiment is configured in a compressed mode, and the UE specifically includes a transmission module 21 and a receiving module 22.

The transmission module 21 is configured to transmit an uplink channel to a BS, where configuration information in the compressed mode includes a transmission interval and a non-transmission interval, so that the BS generates an uplink transmit power control TPC command by estimating receiving quality of the uplink channel transmitted by the UE, increases a current transmit power of the uplink TPC command according to the configuration information of the UE in the compressed mode, and transmits repeatedly the uplink TPC command to the UE according to an increased transmit power.

In this embodiment, the receiving quality of the uplink channel may also include a signal-to-interference ratio SIR, a signal-to-noise ratio SNR, or a signal-to-interference-plus-noise ratio SINR for receiving the uplink channel.

The receiving module 22 is configured to receive the uplink TPC command transmitted repeatedly by the BS.

The UE provided in this embodiment of the present invention is used to execute the power control method provided in Embodiment 2 of the present invention, and has corresponding functional modules. Implementation principles and technical effects of the UE are similar to those of the power control method, and details are not described herein.

Further, in this embodiment, the increased transmit power of the uplink TPC command is obtained by the BS according to a quantity of uplink TPC commands whose transmit timeslots fall in the transmission interval, and the increased transmit power of the uplink TPC command is:

$$P'(k) = \frac{N}{N-M} * P(k).$$

where P(k) is a current transmit power of the uplink TPC command, N is a quantity of repeatedly transmitted uplink TPC commands, and M is the quantity of uplink TPC commands whose transmit timeslots fall in the transmission interval.

Optionally, in the UE provided in this embodiment, the uplink TPC command received by the receiving module 22 may be transmitted through a downlink DPCCH or a downlink F-DPCH. It should be noted that when the uplink TPC command is transmitted through the downlink F-DPCH, the user equipment further includes a processing module 23, configured to: before the receiving module 22 receives the uplink TPC command transmitted repeatedly by the BS, increase a target value of receiving quality of the downlink F-DPCH to N/(N−M) times accordingly.

Embodiment 7

Figure 7:
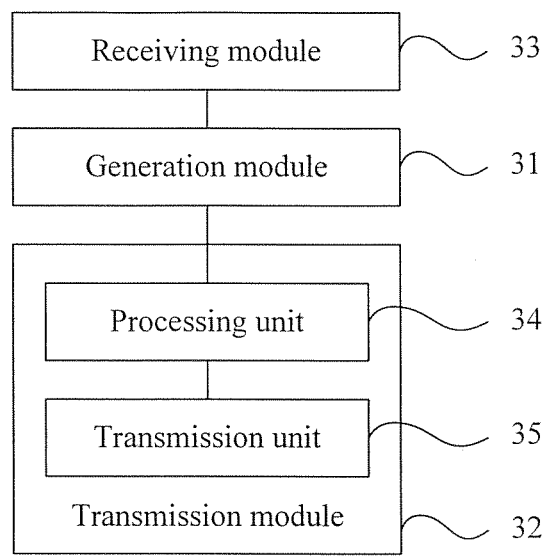
FIG. 7 is a schematic structural diagram of user equipment according to Embodiment 7 of the present invention.

FIG. 7 is a schematic structural diagram of user equipment according to Embodiment 7 of the present invention. As shown in FIG. 7, the UE provided in this embodiment specifically includes a generation module 31 and a transmission module 32.

The generation module 31 is configured to estimate receiving quality of a downlink channel transmitted by a BS, and generate a downlink transmit power control TPC command, where the BS is configured in a compressed mode, and configuration information in the compressed mode includes a transmission interval and a non-transmission interval.

In this embodiment, the receiving quality of the downlink channel may include a signal-to-interference ratio SIR, a signal-to-noise ratio SNR, or a signal-to-interference-plus-noise ratio SINR for receiving the uplink channel.

The transmission module 32 is configured to increase a current transmit power of the downlink TPC command according to the configuration information of the BS in the compressed mode, and repeatedly transmit the downlink TPC command to the BS.

In specific implementation of this embodiment, the UE may further include a receiving module 33, configured to: before the generation module 31 estimates the receiving quality of the downlink channel transmitted by the BS, receive the configuration information of the BS in the compressed mode, where the configuration info illation is delivered by an RNC, so as to increase the transmit power of the downlink TPC command according to the configuration information.

The UE provided in this embodiment of the present invention is used to execute the power control method provided in Embodiment 3 of the present invention, and has corresponding functional modules. Implementation principles and technical effects of the UE are similar to those of the power control method, and details are not described herein.

Further, in the UE provided in this embodiment, the transmission module 32 includes a processing unit 34, configured to: according to a quantity of downlink TPC commands whose transmit timeslots fall in the transmission interval, increase the transmit power of the downlink TPC command to:

$$P'(k) = \frac{N}{N-M} * P(k),$$

where P'(k) is an increased transmit power of the downlink TPC command, P(k) is a current transmit power of the downlink TPC command, N is a quantity of repeatedly transmitted downlink TPC commands, and M is the quantity of downlink TPC commands whose transmit timeslots fall in the transmission interval. The transmission unit 35 is configured to repeatedly transmit the downlink TPC command to the BS according to the increased transmit power P'(k).

It should be noted that in this embodiment, the uplink TPC command transmitted by the transmission module 32 may be specifically transmitted through an uplink DPCCH.

Embodiment 8

Figure 8:
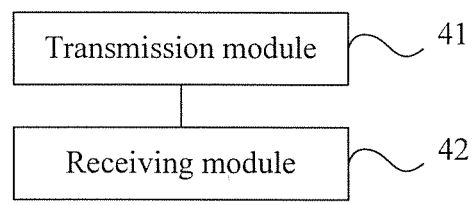
FIG. 8 is a schematic structural diagram of a base station according to Embodiment 8 of the present invention.

FIG. 8 is a schematic structural diagram of a base station according to Embodiment 8 of the present invention. As shown in FIG. 8, the BS provided in this embodiment is configured in a compressed mode, and the BS specifically includes a transmission module 41 and a receiving module 42.

The transmission module 41 is configured to transmit a downlink channel to a UE, where configuration information in the compressed mode includes a transmission interval and a non-transmission interval, so that the UE generates a downlink transmit power control TPC command by estimating receiving quality of the downlink channel transmitted by the BS, increases a current transmit power of the downlink TPC command according to the configuration information of the BS in the compressed mode, and transmits repeatedly the downlink TPC command to the BS according to an increased transmit power.

In this embodiment, the receiving quality of the downlink channel may also include a signal-to-interference ratio SIR, a signal-to-noise ratio SNR, or a signal-to-interference-plus-noise ratio SINR for receiving the downlink channel.

The receiving module 42 is configured to receive the downlink TPC command transmitted repeatedly by the UE.

The BS provided in this embodiment of the present invention is used to execute the power control method provided in Embodiment 4 of the present invention, and has corresponding functional modules. Implementation principles and technical effects of the BS are similar to those of the power control method, and details are not described herein.

Further, in this embodiment, the increased transmit power of the downlink TPC command is obtained by the UE according to a quantity of downlink TPC commands whose transmit timeslots fall in the transmission interval, and the increased transmit power of the downlink TPC command is:

$$P'(k) = \frac{N}{N-M} * P(k),$$

where P(k) is a current transmit power of the downlink TPC command, N is a quantity of repeatedly transmitted downlink TPC commands, and M is the quantity of downlink TPC commands whose transmit timeslots fall in the transmission interval.

It should be noted that in this embodiment, the downlink TPC command received by the receiving module 42 may be specifically transmitted through an uplink DPCCH.

Embodiment 9

Figure 9:
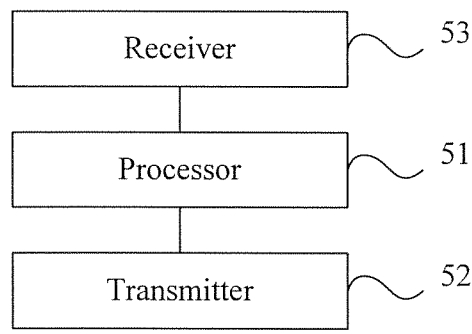
FIG. 9 is a schematic structural diagram of a base station according to Embodiment 9 of the present invention.

FIG. 9 is a schematic structural diagram of a base station according to Embodiment 9 of the present invention. As shown in FIG. 9, the BS provided in this embodiment specifically includes a processor 51 and a transmitter 52.

The processor 51 is configured to estimate receiving quality of an uplink channel transmitted by a UE, and generate an uplink transmit power control TPC command, where the UE is configured in a compressed mode, and configuration information in the compressed mode includes a transmission interval and a non-transmission interval.

In this embodiment, the receiving quality of the uplink channel may include a signal-to-interference ratio SIR, a signal-to-noise ratio SNR, or a signal-to-interference-plus-noise ratio SINR for receiving the uplink channel.

The transmitter 52 is configured to increase a current transmit power of the uplink TPC command according to the configuration information of the UE in the compressed mode, and repeatedly transmit the uplink TPC command to the UE.

In specific implementation of this embodiment, the BS may further include a receiver 53, configured to: before the processor 51 estimates the receiving quality of the uplink channel transmitted by the UE, receive the configuration information of the UE in the compressed mode, where the configuration information is delivered by an RNC, so as to increase the transmit power of the uplink TPC command according to the configuration information.

The BS provided in this embodiment of the present invention is used to execute the power control method provided in Embodiment 1 of the present invention, and has corresponding entity apparatuses. Implementation principles and technical effects of the BS are similar to those of the power control method, and details are not described herein.

Further, in the BS provided in this embodiment, the transmitter 52 is specifically configured to: according to a quantity of uplink TPC commands whose transmit timeslots fall in the transmission interval, increase the transmit power of the uplink TPC command to:

$$P'(k) = \frac{N}{N-M} * P(k),$$

where P'(k) is an increased transmit power of the uplink TPC command, P(k) is a current transmit power of the uplink TPC command, N is a quantity of repeatedly transmitted uplink TPC commands, and M is the quantity of uplink TPC commands whose transmit timeslots fall in the transmission interval; and repeatedly transmit the uplink TPC command to the UE according to the increased transmit power P'(k).

Optionally, the uplink TPC command transmitted by the transmitter 52 may be transmitted through a downlink DPCCH or a downlink F-DPCH. It should be noted that when the uplink TPC command is transmitted through the downlink F-DPCH, a target value of receiving quality of the downlink F-DPCH is increased to N/(N−M) times accordingly.

Embodiment 10

Figure 10:
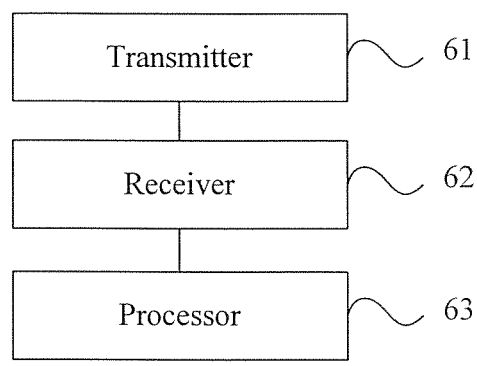
FIG. 10 is a schematic structural diagram of user equipment according to Embodiment 10 of the present invention.

FIG. 10 is a schematic structural diagram of user equipment according to Embodiment 10 of the present invention. As shown in FIG. 10, the UE provided in this embodiment is configured in a compressed mode, and the UE specifically includes a transmitter 61 and a receiver 62.

The transmitter 61 is configured to transmit an uplink channel to a BS, where configuration information in the compressed mode includes a transmission interval and a non-transmission interval, so that the BS generates an uplink transmit power control TPC command by estimating receiving quality of the uplink channel transmitted by the UE, increases a current transmit power of the uplink TPC command according to the configuration information of the UE in the compressed mode, and transmits repeatedly the uplink TPC command to the UE according to an increased transmit power.

In this embodiment, the receiving quality of the uplink channel may also include a signal-to-interference ratio SIR, a signal-to-noise ratio SNR, or a signal-to-interference-plus-noise ratio SINR for receiving the uplink channel.

The receiver 62 is configured to receive the uplink TPC command transmitted repeatedly by the BS.

The UE provided in this embodiment of the present invention is used to execute the power control method provided in Embodiment 2 of the present invention, and has corresponding entity apparatuses. Implementation principles and technical effects of the UE are similar to those of the power control method, and details are not described herein.

Further, in this embodiment, the increased transmit power of the uplink TPC command is obtained by the BS according to a quantity of uplink TPC commands whose transmit timeslots fall in the transmission interval, and the increased transmit power of the uplink TPC command is:

$$P'(k) = \frac{N}{N-M} * P(k),$$

where P(k) is a current transmit power of the uplink TPC command, N is a quantity of repeatedly transmitted uplink TPC commands, and M is the quantity of uplink TPC commands whose transmit timeslots fall in the transmission interval.

Optionally, in the UE provided in this embodiment, the uplink TPC command received by the receiver 62 may be transmitted through a downlink DPCCH or a downlink F-DPCH. It should be noted that when the uplink TPC command is transmitted through the downlink F-DPCH, the UE further includes a processor 63, configured to: before the receiver 62 receives the uplink TPC command transmitted repeatedly by the BS, increase a target value of receiving quality of the downlink F-DPCH to N/(N−M) times accordingly.

Embodiment 11

Figure 11:
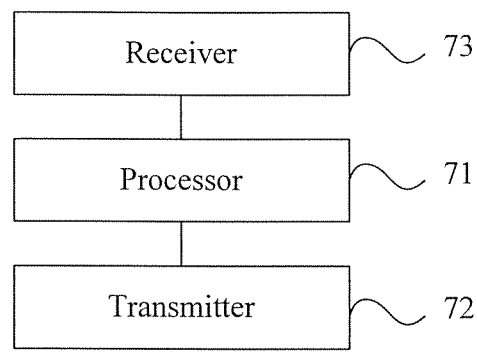
FIG. 11 is a schematic structural diagram of user equipment according to Embodiment 11 of the present invention.

FIG. 11 is a schematic structural diagram of user equipment according to Embodiment 11 of the present invention. As shown in FIG. 11, the UE provided in this embodiment specifically includes a processor 71 and a transmitter 72.

The processor 71 is configured to estimate receiving quality of a downlink channel transmitted by a BS, and generate a downlink transmit power control TPC command, where the BS is configured in a compressed mode, and configuration information in the compressed mode includes a transmission interval and a non-transmission interval.

In this embodiment, the receiving quality of the downlink channel may include a signal-to-interference ratio SIR, a signal-to-noise ratio SNR, or a signal-to-interference-plus-noise ratio SINR for receiving the uplink channel.

The transmitter 72 is configured to increase a current transmit power of the downlink TPC command according to the configuration information of the BS in the compressed mode, and repeatedly transmit the downlink TPC command to the BS.

In specific implementation of this embodiment, the UE may further include a receiver 73, configured to: before the processor 71 estimates the receiving quality of the downlink channel transmitted by the BS, receive the configuration information of the BS in the compressed mode, where the configuration information is delivered by an RNC, so as to increase the transmit power of the downlink TPC command according to the configuration information.

The UE provided in this embodiment of the present invention is used to execute the power control method provided in Embodiment 3 of the present invention, and has corresponding entity apparatuses. Implementation principles and technical effects of the UE are similar to those of the power control method, and details are not described herein.

Further, in the UE provided in this embodiment, the transmitter 72 is specifically configured to: according to a quantity of downlink TPC commands whose transmit timeslots fall in the transmission interval, increase the transmit power of the downlink TPC command to:

$$P'(k) = \frac{N}{N-M} * P(k),$$

where P'(k) is an increased transmit power of the downlink TPC command, P(k) is a current transmit power of the downlink TPC command, N is a quantity of repeatedly transmitted downlink TPC commands, and M is the quantity of downlink TPC commands whose transmit timeslots fall in the transmission interval; and repeatedly transmit the downlink TPC command to the BS according to the increased transmit power P'(k).

It should be noted that in this embodiment, the uplink TPC command transmitted by the transmitter 72 may be specifically transmitted through an uplink DPCCH.

Embodiment 12

Figure 12:
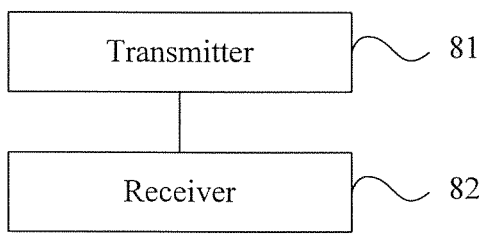
FIG. 12 is a schematic structural diagram of a base station according to Embodiment 12 of the present invention.

FIG. 12 is a schematic structural diagram of a base station according to Embodiment 12 of the present invention. As shown in FIG. 12, the BS provided in this embodiment is configured in a compressed mode, and the BS specifically includes a transmitter 81 and a receiver 82.

The transmitter 81 is configured to transmit a downlink channel to a UE, where configuration information in the compressed mode includes a transmission interval and a non-transmission interval, so that the UE generates a downlink transmit power control TPC command by estimating receiving quality of the downlink channel transmitted by the BS, increases a current transmit power of the downlink TPC command according to the configuration information of the BS in the compressed mode, and transmits repeatedly the downlink TPC command to the BS according to an increased transmit power.

In this embodiment, the receiving quality of the downlink channel may also include a signal-to-interference ratio SIR, a signal-to-noise ratio SNR, or a signal-to-interference-plus-noise ratio SINR for receiving the downlink channel.

The receiver 82 is configured to receive the downlink TPC command transmitted repeatedly by the UE.

The BS provided in this embodiment of the present invention is used to execute the power control method provided in Embodiment 4 of the present invention, and has corresponding entity apparatuses. Implementation principles and technical effects of the BS are similar to those of the power control method, and details are not described herein.

Further, in this embodiment, the increased transmit power of the downlink TPC command is obtained by the UE according to a quantity of downlink TPC commands whose transmit timeslots fall in the transmission interval, and the increased transmit power of the downlink TPC command is:

$$P'(k) = \frac{N}{N-M} * P(k),$$

where P(k) is a current transmit power of the downlink TPC command, N is a quantity of repeatedly transmitted downlink TPC commands, and M is the quantity of downlink TPC commands whose transmit timeslots fall in the transmission interval.

It should be noted that in this embodiment, the downlink TPC command received by the receiver 82 may be specifically transmitted through an uplink DPCCH.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A power control method, comprising:
   estimating, by a base station (BS), receiving quality of an uplink channel transmitted by user equipment (UE), and generating an uplink transmit power control (TPC) command, wherein the UE is configured in a compressed mode, and configuration information in the compressed mode comprises a transmission interval and a non-transmission interval; and
   increasing a current transmit power of the uplink TPC command according to the configuration information of the UE in the compressed mode, and repeatedly transmitting the uplink TPC command to the UE.

2. The method according to claim 1, wherein increasing a current transmit power of the uplink TPC command according to the configuration information in the compressed mode and repeatedly transmitting the uplink TPC command to the UE comprises:
   according to a quantity of uplink TPC commands whose transmit timeslots fall in the transmission interval, increasing the transmit power of the uplink TPC command to:

$$P'(k) = \frac{N}{N-M} * P(k),$$

wherein P'(k) is an increased transmit power of the uplink TPC command, P(k) is a current transmit power of the uplink TPC command, N is a quantity of repeatedly transmitted uplink TPC commands, and M is the quantity of uplink TPC commands whose transmit timeslots fall in the transmission interval; and
repeatedly transmitting the uplink TPC command to the UE according to the increased transmit power P'(k).

3. The method according to claim 1, wherein the uplink TPC command is transmitted through a downlink dedicated physical control channel (DPCCH) or a downlink fractional dedicated physical channel (F-DPCH).

4. The method according to claim 3, wherein when the uplink TPC command is transmitted through the downlink F-DPCH, a target value of receiving quality of the downlink F-DPCH is increased to N/(N−M) times accordingly.

5. The method according to claim 1, wherein the receiving quality of the uplink channel comprises:
   a signal-to-interference ratio (SIR);
   a signal-to-noise ratio (SNR), or
   a signal-to-interference-plus-noise ratio (SINR).

6. The method according to claim 1, wherein before estimating, by a base station (BS), receiving quality of an uplink channel transmitted by user equipment UE, the method further comprises:

receiving configuration information of the UE delivered by a radio network controller (RNC), wherein the configuration information of the UE comprises the configuration information of the UE configured in the compressed mode.

7. A power control method, comprising:
transmitting, by user equipment (UE) configured in a compressed mode, an uplink channel to a base station (BS), wherein configuration information in the compressed mode comprises a transmission interval and a non-transmission interval, so that the BS generates an uplink transmit power control (TPC) command by estimating receiving quality of the uplink channel transmitted by the UE, increases a current transmit power of the uplink TPC command according to the configuration information of the UE in the compressed mode, and transmits repeatedly the uplink TPC command to the UE according to the increased transmit power; and
receiving the uplink TPC command transmitted repeatedly by the BS.

8. The method according to claim 7, wherein the increased transmit power of the uplink TPC command is obtained by the BS according to a quantity of uplink TPC commands whose transmit timeslots fall in the transmission interval, and the increased transmit power of the uplink TPC command is:

$$P'(k) = \frac{N}{N-M} * P(k),$$

wherein P(k) is a current transmit power of the uplink TPC command, N is a quantity of repeatedly transmitted uplink TPC commands, and M is the quantity of uplink TPC commands whose transmit timeslots fall in the transmission interval.

9. The method according to claim 7, wherein the uplink TPC command is transmitted through a downlink dedicated physical control channel (DPCCH) or a downlink fractional dedicated physical channel (F-DPCH).

10. The method according to claim 7, wherein when the uplink TPC command is transmitted through the downlink F-DPCH, before receiving the uplink TPC command transmitted repeatedly by the BS, the method further comprises:
increasing a target value of receiving quality of the downlink F-DPCH to N/(N–M) times accordingly.

11. A base station, comprising:
a processor, configured to estimate receiving quality of an uplink channel transmitted by user equipment (UE), and generate an uplink transmit power control (TPC) command, wherein the UE is configured in a compressed mode, and configuration information in the compressed mode comprises a transmission interval and a non-transmission interval; and
a transmitter, configured to increase a current transmit power of the uplink TPC command according to the configuration information of the UE in the compressed mode, and repeatedly transmit the uplink TPC command to the UE.

12. The base station according to claim 11, wherein the transmitter is configured to:
according to a quantity of uplink TPC commands whose transmit timeslots fall in the transmission interval, increase the transmit power of the uplink TPC command to:

$$P'(k) = \frac{N}{N-M} * P(k),$$

wherein P'(k) is an increased transmit power of the uplink TPC command, P(k) is a current transmit power of the uplink TPC command, N is a quantity of repeatedly transmitted uplink TPC commands, and M is the quantity of uplink TPC commands whose transmit timeslots fall in the transmission interval; and
repeatedly transmit the uplink TPC command to the UE according to the increased transmit power P'(k).

13. The base station according to claim 11, wherein the uplink TPC command transmitted by the transmission module is transmitted through a downlink dedicated physical control channel (DPCCH) or a downlink fractional dedicated physical channel (F-DPCH).

14. The base station according to claim 11, wherein when the uplink TPC command is transmitted through the downlink F-DPCH, a target value of receiving quality of the downlink F-DPCH is increased to NI (N–M) times accordingly.

15. The base station according to claim 11, wherein the receiving quality of the uplink channel comprises:
a signal-to-interference ratio (SIR);
a signal-to-noise ratio (SNR);
or a signal-to-interference-plus-noise ratio (SINR).

16. The base station according to claim 11, further comprising:
a receiver, configured to: before the processor estimates the receiving quality of the uplink channel transmitted by the UE, receive configuration information of the UE delivered by a radio network controller (RNC), wherein the configuration information of the UE comprises the configuration information of the UE configured in the compressed mode.

17. A user equipment (UE) configured in a compressed mode, the UE comprising:
a transmitter, configured to transmit an uplink channel to a base station (BS), wherein configuration information in the compressed mode comprises a transmission interval and a non-transmission interval, so that the BS generates an uplink transmit power control (TPC) command by estimating receiving quality of the uplink channel transmitted by the UE, increases a current transmit power of the uplink TPC command according to the configuration information of the UE in the compressed mode, and transmits repeatedly the uplink TPC command to the UE according to the increased transmit power; and
a receiving module, configured to receive the uplink TPC command transmitted repeatedly by the BS.

18. The user equipment according to claim 17, wherein the increased transmit power of the uplink TPC command is obtained by the BS according to a quantity of uplink TPC commands whose transmit timeslots fall in the transmission interval, and the increased transmit power of the uplink TPC command is:

$$P'(k) = \frac{N}{N-M} * P(k),$$

wherein P(k) is a current transmit power of the uplink TPC command, N is a quantity of repeatedly transmitted uplink TPC commands, and M is the quantity of uplink TPC commands whose transmit timeslots fall in the transmission interval.

19. The user equipment according to claim 17, wherein the uplink TPC command received by the receiving module is transmitted through a downlink dedicated physical control channel (DPCCH) or a downlink fractional dedicated physical channel (F-DPCH).

20. The user equipment according to claim 17, wherein when the uplink TPC command is transmitted through the downlink F-DPCH, the device further comprises a processing module, configured to:
   before the receiving module receives the uplink TPC command transmitted repeatedly by the BS, increase a target value of receiving quality of the downlink F-DPCH to N/(N−M) times accordingly.

* * * * *